(12) United States Patent
Schwartz et al.

(10) Patent No.: US 6,370,109 B1
(45) Date of Patent: Apr. 9, 2002

(54) CDMA SIGNAL POWER CONTROL USING QUADRATURE SIGNAL CALCULATIONS

(75) Inventors: Bruce S. Schwartz; Brian K. Harms, both of Boulder; Anthony C. K. Soong; Todd A. Pressley, both of Superior; Robin D. Knight, Loveland, all of CO (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/265,205

(22) Filed: Mar. 10, 1999

(51) Int. Cl.[7] .......................... H04B 7/216; H04J 13/02
(52) U.S. Cl. ...................... 370/203; 370/335; 370/342; 375/146; 375/297; 455/115; 455/450; 455/522
(58) Field of Search ................................. 370/203, 206, 370/207, 208, 320, 328, 329, 335, 342; 375/130, 140, 141, 146, 295–297, 302–304, 344–346, 350, 367; 455/68, 69, 70, 115, 116, 117, 230, 232.1, 234.1, 234.2, 422, 450, 507, 517, 522

(56) References Cited

U.S. PATENT DOCUMENTS

| 5,267,262 A | * | 11/1993 | Wheatley, III | 375/1 |
| 5,396,516 A | * | 3/1995 | Padovani et al. | 375/225 |
| 5,469,471 A | * | 11/1995 | Wheatley, III | 375/205 |
| 5,691,974 A | * | 11/1997 | Zehavi et al. | 370/203 |
| 5,752,172 A | * | 5/1998 | Matero | 455/127 |
| 6,041,081 A | * | 3/2000 | O et al. | 375/297 |

* cited by examiner

Primary Examiner—Alpus H. Hsu
(74) Attorney, Agent, or Firm—R. Ben Miller; Christopher Edwards (57) ABSTRACT

The invention is CDMA quadrature signal technology that controls the transmit power of a CDMA signal. The CDMA quadrature signal technology receives a CDMA signal, and in response, process quadrature components of the CDMA signal to generate a power control signal. The CDMA quadrature signal technology adjusts the gain of the CDMA signal in response to the power control signal. A CDMA transmitter transmits the CDMA signal after the gain is adjusted. One example of the CDMA transmitter is a CDMA base station. Using the invention, a multi-sector CDMA base station can control power without transferring gain information to base station components for all sectors. The invention eliminates unnecessary data transfer and storage.

23 Claims, 7 Drawing Sheets

CDMA SIGNAL POWER CONTROL USING QUADRATURE SIGNAL CALCULATIONS

BACKGROUND OF THE INVENTION

I. Field of the Invention

The present invention relates to Code Division Multiple Access (CDMA) systems. More particularly, the present invention includes, but is not limited to, a novel and improved CDMA base station that controls transmit power based on quadrature signal calculations.

II. Description of the Related Art

Code Division Multiple Access (CDMA) technology is commonly used in communications systems. In a typical CDMA system, a CDMA base station transmits a CDMA signal to numerous CDMA communications devices, such as wireless telephones. The CDMA signal is comprised of numerous individual user signals. The CDMA base station generates the CDMA signal by encoding each individual user signal with a unique spreading sequence, such as a pseudo random sequence. The CDMA base station then adds the encoded user signals together to form the CDMA signal.

In a CDMA system, individual user signals are not separated based on frequency or time, but are spread across the entire frequency band. Each CDMA communications device derives its particular user signal based on the unique spreading sequence. Due to this combination of multiple signals encoded with random sequences, the CDMA signal has special power concerns because each signal represents noise to the other signals that share the frequency band. Thus, CDMA transmission systems must carefully track the power of each signal.

Baseband CDMA signals are typically generated in a well-known quadrature format comprised of quadrature CDMA signals I and Q. Quadrature CDMA signals I and Q are transmitted using carriers of the same frequency, but in phase quadrature. In other words, an RF CDMA signal can be constructed by modulating I by cosine (2×pi×frequency×time) and by modulating Q by sine (2×pi×frequency×time). In IS-95A, quadrature signals carry the same data with different pseudo-random sequence codes.

Figure 1:
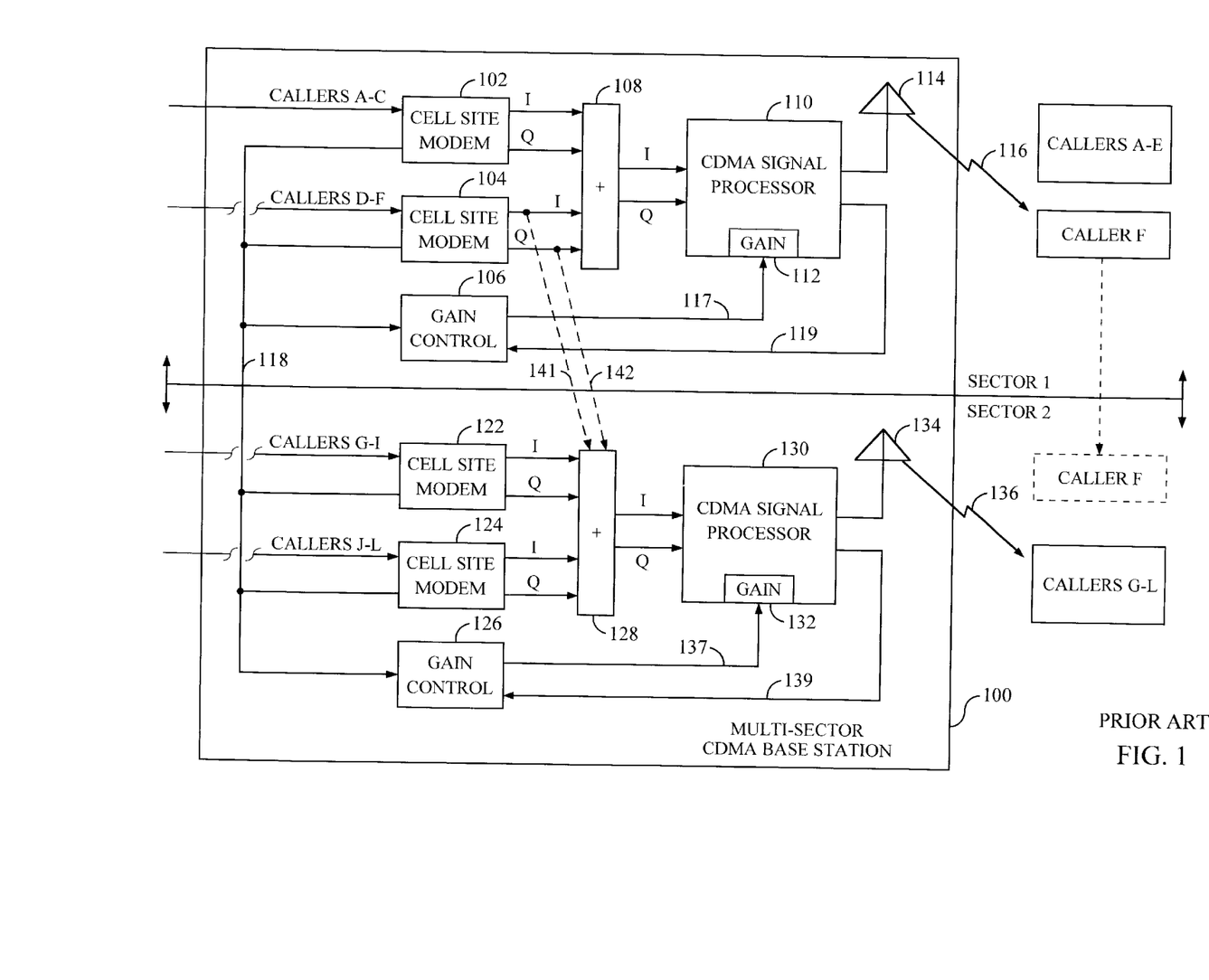
FIG. 1 is a block diagram of a prior art CDMA base station.

FIG. 1 depicts a multi-sector base station 100 that is currently known in the art. The base station 100 is divided into geographic sectors with callers A–F in sector 1 and callers G–L in sector 2. For the sake of illustration, caller F will move from sector 1 to sector 2 as indicated by the dashed lines, but the operation of the base station 100 is first discussed prior to the caller F move from sector 1 to sector 2. Those skilled in the art will appreciate that the diagram of the base station 100 has been simplified for clarity.

The sector 1 portion of the base station 100 includes cell site modems 102 and 104, gain control 106, summing circuit 108, CDMA signal processor 110 including gain 112, and antenna 114. The sector 2 portion of the base station 100 includes cell site modems 122 and 124, gain control 126, summing circuit 128, CDMA signal processor 130 including gain 132, and antenna 134.

In operation, the cell site modem 102 receives signals for callers A, B, C and applies conventional CDMA processing to generate CDMA quadrature signals I and Q. The cell site modem 102 provides the CDMA quadrature signals I and Q to the summing circuit 108. The cell site modem 104 receives signals for callers D, E, F and applies conventional CDMA processing to generate CDMA quadrature signals I and Q. The cell site modem 104 provides the CDMA quadrature signals I and Q to the summing circuit 108. The summing circuit separately combines the I signals and the Q signals and transfers them to the CDMA signal processor 110. The CDMA signal processor 110 performs analog conversion, filtering, up-conversion, and amplification to provide a Radio Frequency (RF) CDMA signal to the antenna 114. The antenna 114 transmits the RF CDMA signal 116 over the air to the callers A–F in sector 1.

The cell site modem 122 receives signals for callers G, H, I and applies conventional CDMA processing to generate CDMA quadrature signals I and Q. The cell site modem 122 provides the CDMA quadrature signals I and Q to the summing circuit 128. The cell site modem 124 receives signals for callers J, K, L and applies conventional CDMA processing to generate CDMA quadrature signals I and Q. The cell site modem 124 provides the CDMA quadrature signals I and Q to the summing circuit 128. The summing circuit separately combines the I signals and the Q signals and transfers them to the CDMA signal processor 130. The CDMA signal processor 130 performs analog conversion, filtering, up-conversion, and amplification to provide an RF CDMA signal to the antenna 134. The antenna 134 transmits the RF CDMA signal 136 over the air to the callers G–L in sector 2.

Each cell cite modem 102, 104, 122, and 124 provides gain information 118 to both the gain control 106 and the gain control 126. The gain information 118 includes the squared gain for each call, pilot signal, and overhead. Gain control 106 and gain control 126 each maintain a database that incorporates the gain information 118.

Figure 2:
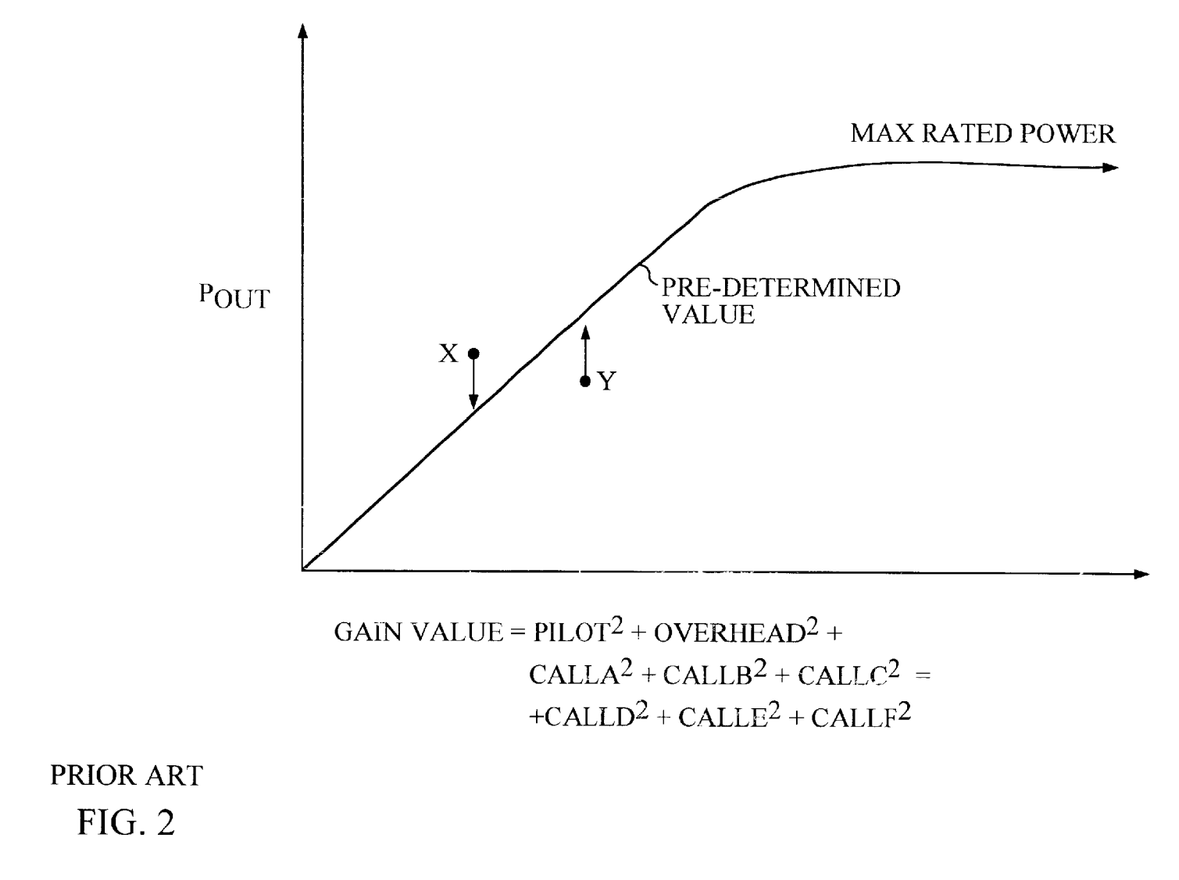
FIG. 2 is a graph illustrating prior art power calculation and control for CDMA signal transmission.

The CDMA signal processor 110 monitors the transmit power (Pout) of the CDMA signal 116 for sector 1 and provides a Pout value 119 for sector 1 to the gain control 106. The gain control 106 compares the Pout value 119 for the CDMA signal 116 to a Gain Value (GV) equal to the sum of the squared gains for the CDMA signal 116. The squared gains for the CDMA signal 116 are obtained from the gain information 118. The gain control 106 transfers a control signal 117 to the gain 112 to adjust the Pout to maintain a ratio of GV to Pout at a pre-determined value. FIG. 2 shows the desired relationship between Pout and the GV. The points X and Y represent operational measurements, and the arrows represent the control applied through the control signal 117 to the gain 112 to maintain the pre-determined value. Those skilled in the art are aware that the slope of the pre-determined value blossoms during start-up and wilts during shut-down.

The CDMA signal processor 130 monitors the Pout for sector 2 and provides the Pout value 139 for sector 2 to the gain control 126. The gain control 126 compares the Pout value 139 for the CDMA signal 136 to a GV equal to the sum of the squared gains for the CDMA signal 136. The squared gains for the CDMA signal 136 are obtained from the gain information 118. The gain control 126 transfers a control signal 137 to the gain 132 to adjust Pout to maintain a ratio of GV to Pout at a predetermined value.

When caller F moves from sector 1 to sector 2, the cell site modem 104 for sector 1 transfers the caller F quadrature signals 141 and 142 to the summing circuit 128 for sector 2. Thus, the CDMA signal 136 now includes the caller F signal. As a result, the gain control 126 must now add the square of the caller F gain to its GV.

It should be appreciated that each cell site modem must transfer all gain information 118 to the gain control in each sector. This requires a data transfer arrangement across all sectors, and much of the transferred data is unnecessary. For example, gain control 126 does not need the gain for caller A unless caller A moves into sector 2. The gain control for each sector must also track the calls in its sector and perform repeated calculations based on a changing database. The current power calculation technique for CDMA base stations should be improved to reduce data transfer and storage.

SUMMARY OF THE INVENTION

The above-described problem is solved with CDMA quadrature signal technology that controls the transmit power of a CDMA signal. The CDMA quadrature signal technology eliminates unnecessary data transfer and storage because gain control is accomplished without transferring or using per call gain information. The CDMA quadrature signal technology receives a CDMA signal, and in response, processes quadrature components of the CDMA signal to generate a power control signal. The CDMA quadrature signal technology adjusts the gain of the CDMA signal in response to the power control signal. A CDMA transmitter transmits the CDMA signal after the gain is adjusted. One example of the CDMA transmitter is a CDMA base station. Using the invention, a multi-sector CDMA base station can control power without transferring gain information to base station components for all sectors.

In some examples of the invention, a multi-sector base station squares and sums the quadrature I and Q signals in a CDMA signal for a given sector. A ratio is then formed by comparing the sum to the transmit power of the CDMA signal. The transmit power of the CDMA signal is controlled to move the ratio closer to a pre-determined value that optimizes base station performance.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 3:
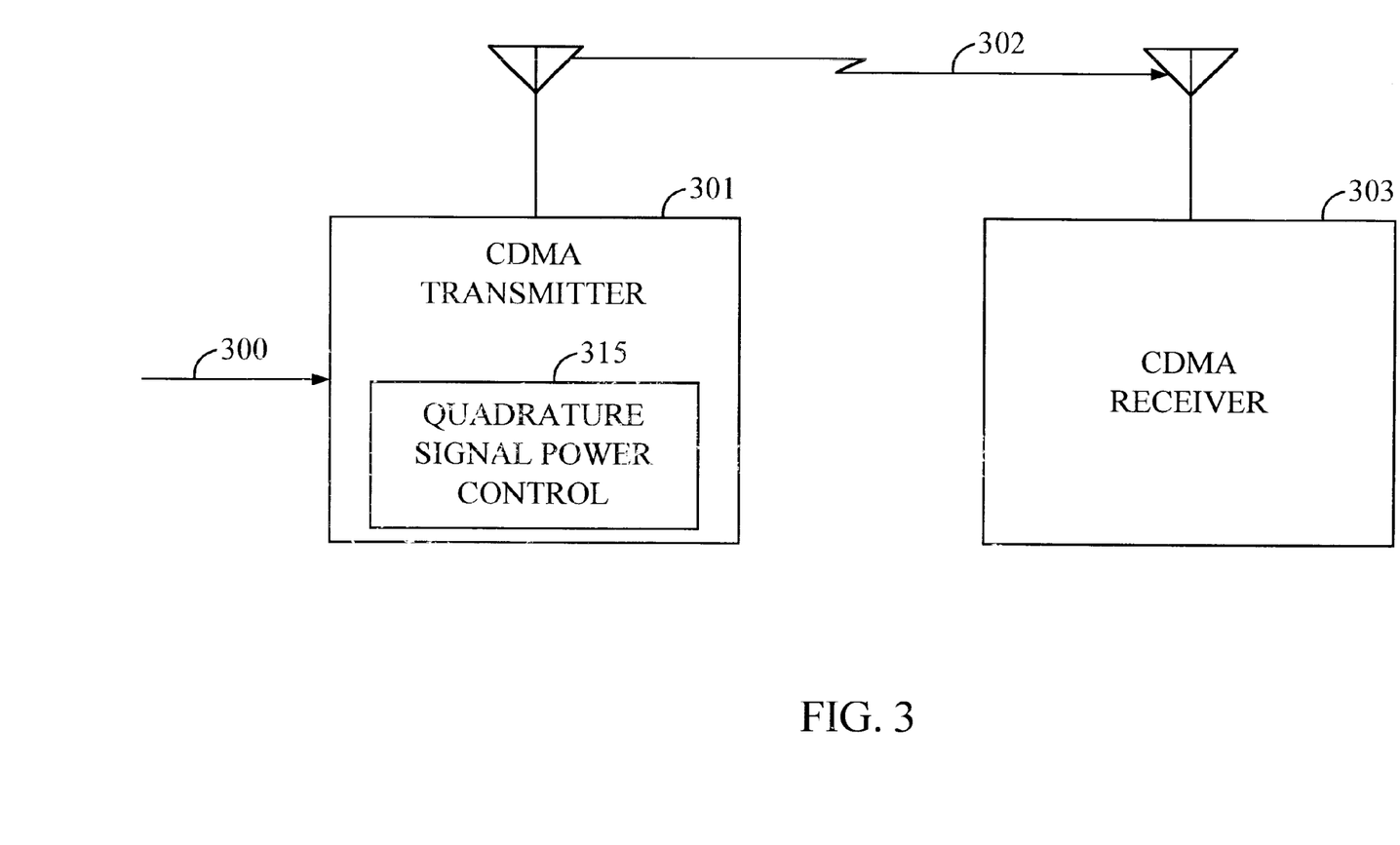
FIG. 3 is a block diagram of a CDMA transmitter with quadrature signal power control logic.

CDMA Quadrature Signal Power Control—FIG. 3

FIG. 3 depicts a baseband CDMA signal 300, a CDMA transmitter 301, an RF CDMA signal 302, and a CDMA receiver 303. CDMA is a spread-spectrum communications technology. Some versions of CDMA are specified by standards, such as IS-95 approved by the Telecommunications Industry association. The CDMA signal 300 could be any CDMA signal, such as the signal produced by a cell site modem in a CDMA base station. The CDMA receiver 303 could be any CDMA device capable of receiving a CDMA signal, such as a wireless CDMA telephone.

The CDMA transmitter 301 could be any CDMA transmission device that can transmit the CDMA signal 302 and that includes quadrature signal power control logic 315. Quadrature signal power control logic 315 is any circuitry that is operational to: 1) receive a CDMA signal, and in response, process quadrature components of the CDMA signal to generate a power control signal, and 2) adjust the gain of the CDMA signal 302 in response to the power control signal. The CDMA transmitter 301 transmits the CDMA signal 302 after the gain is adjusted. One example of the CDMA transmitter 301 is a CDMA base station.

CDMA Communications System—FIGS. 4–7

Figure 4:
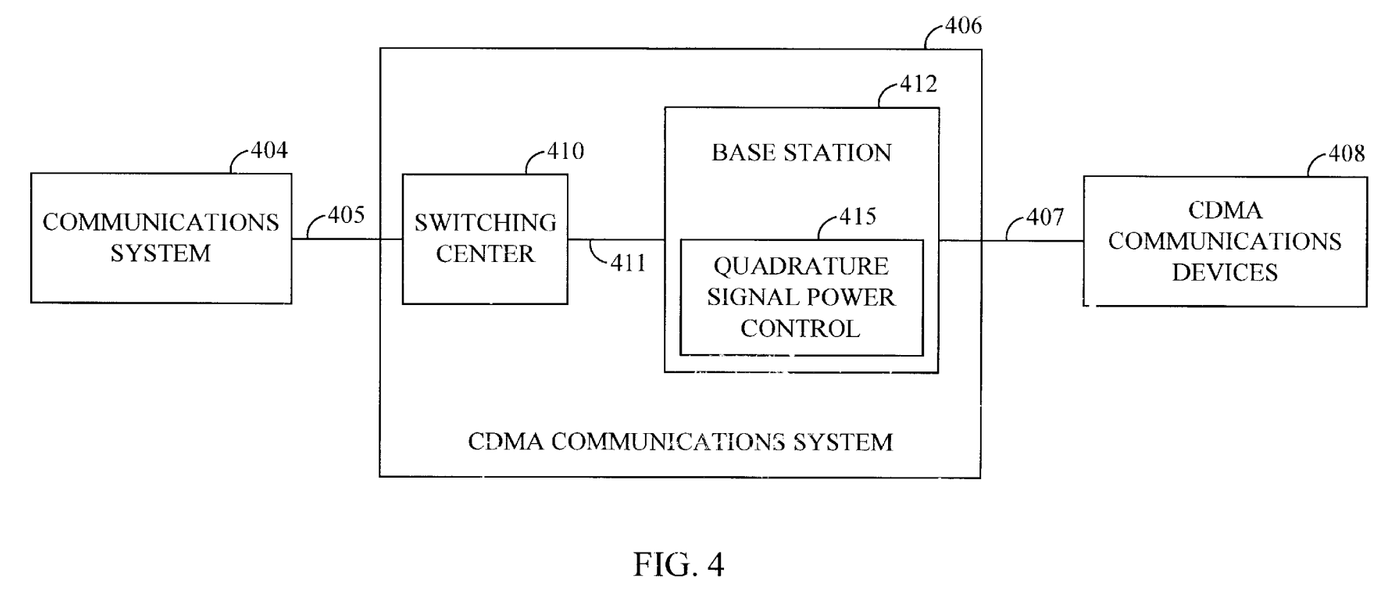
FIG. 4 is a block diagram of a CDMA communications system with quadrature signal power control logic.

FIGS. 4–7 depict a specific example of a CDMA system that uses quadrature signal power control, but those skilled in the art will recognize numerous other types of CDMA systems that are applicable to the quadrature signal power control invention described above. FIG. 4 depicts a communications system 404 that is connected to the CDMA communications system 406. The CDMA communications system 406 communicates with CDMA communications devices 408. The CDMA communications system 406 is comprised of a switching center 410 and a base station 412. The communications system 404 exchanges communications signals 405 with the switching center 410. The switching center 410 exchanges communications signals 411 with the base station 412. The base station 412 exchanges wireless CDMA communications signals 407 over the air interface with the CDMA communications devices 408. Although the invention is depicted using an air interface, other transmission media could also be used, such as RF cable, power lines, or telephone lines.

The communications system 404 could be any communications system capable of exchanging communications signals 405 with the CDMA communications system 406. The communications system 404 is typically a conventional public telephone network, but could also be many other networks, such as a local area network, wide area network, or internet.

The switching center 410 could be any device that provides an interface between the base station 412 and the communications system 404. Typically, numerous base stations are connected to the communications system 404 through the switching center 410, but the number of base stations has been restricted for the purpose of clarity.

The base station 412 exchanges wireless CDMA signals 407 with the CDMA communications devices 408. The base station 412 includes quadrature signal power control logic 415 that monitors and controls the transmit power of the CDMA signals 407 by performing quadrature signal calculations. Typically, numerous CDMA communications devices exchange signals with the base station 412, but the number of communications devices has been restricted for the purpose of clarity. Those skilled in the art could adapt the base station 412 from known systems, such as the base stations provided by Qualcomm, Inc. of San Diego, Calif.

The CDMA communications devices 408 exchange wireless CDMA signals 407 with the base station 412. The typical CDMA communications device is a mobile telephone, but other CDMA communications devices are also possible, such as fixed wireless devices, data terminals, set-top boxes, or computers.

In operation, the CDMA communications devices 408 communicate through the CDMA communications system 406 with the communications system 404 or with each other. The quadrature signal power control logic 415 in the base station 412 monitors and controls the transmit power of the CDMA signals 407 on the communications path from the communications system 404 to the CDMA communications devices 408.

Figure 5:
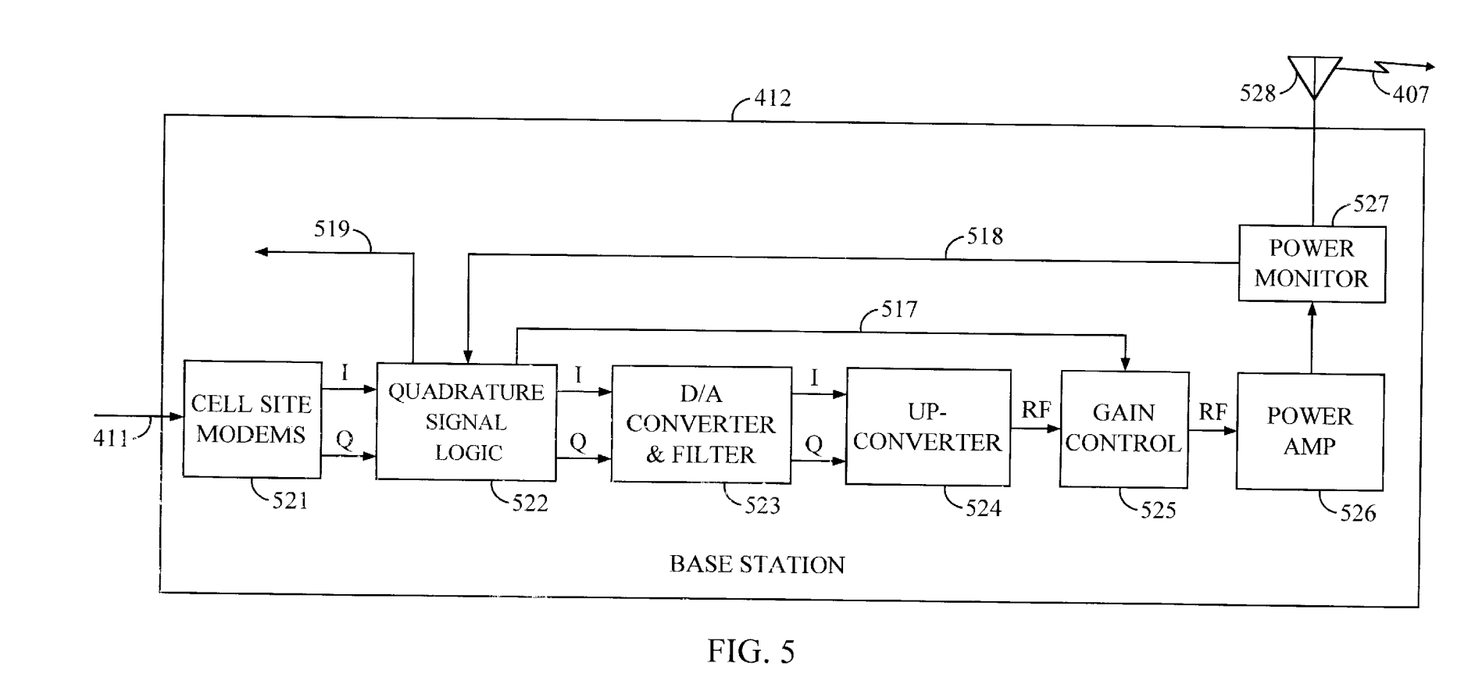
FIG. 5 is a block diagram of a CDMA base station with quadrature signal power control logic.

FIG. 5 depicts the base station 412 of FIG. 4 receiving the communications signals 411 and transmitting the CDMA communications signals 407. The base station could be a multi-sector base station with the circuitry of FIG. 5 replicated for each sector. Advantageously, there is no need for an arrangement to share gain information across sectors.

The base station 512 is comprised of the following elements connected in series: cell site modems 521, quadrature signal logic 522, digital-to-analog conversion and filter 523, up-converter 524, gain control 525, power amplifier 526, power monitor 527, and antenna 528. The quadrature signal power control logic 415 of FIG. 4 is represented by quadrature signal logic 522, gain control 525, and power monitor 527 on FIG. 5. Aside from the quadrature signal logic 522, those skilled in the art are familiar with these elements and their operation.

The cell site modems 521 produce a CDMA signal comprised of quadrature signals I and Q. Quadrature CDMA signals I and Q are well-known and are baseband signals to be transmitted using carriers of the same frequency, but in phase quadrature. The cell site modems 521 may apply forward error correction coding before transferring the quadrature signals I and Q to the quadrature signal logic 522.

The quadrature signal logic 522 receives the quadrature I and Q signals from the cell site modems 521 and a transmit power (Pout) signal 518 from the power monitor 527. In response, the quadrature signal logic 522 processes the quadrature components of the CDMA signal to generate a power control signal 517 and a capacity control signal 519. The processing entails: 1) processing the quadrature I and Q components to determine a quadrature CDMA signal power value, 2) comparing the quadrature CDMA signal power value to the transmit power value from the Pout signal 518, and 3) generating the power control signal 517 and the capacity control signal 519 based on the comparison. The quadrature signal logic 522 provides the quadrature I and Q signals to the digital-to-analog conversion and filter 523.

The digital-to-analog conversion and filter 523 converts the I and Q signals to analog and filters out components outside of the desired bandwidth. The digital-to-analog conversion and filter 523 provides the analog I and Q signals to the up-converter 524. The up-converter 524 modulates the analog I and Q signals with intermediate and radio frequencies to form an RF CDMA signal and provides the RF CDMA signal to the gain control 525. The gain control 525 adjusts the gain of the RF CDMA signal based on the power control signal 517 and provides the gain-adjusted RF CDMA signal to the power amplifier 526. The power amplifier 526 amplifies the RF CDMA signal and provides the amplified RF CDMA signal to the power monitor 527. The power monitor 527 monitors the transmit power of the RF CDMA signal and provides the Pout signal 518 to the quadrature signal logic 522. The power monitor 527 provides the RF CDMA signal to the antenna 528. The antenna 528 transmits the RF CDMA signal 407.

Figure 6:
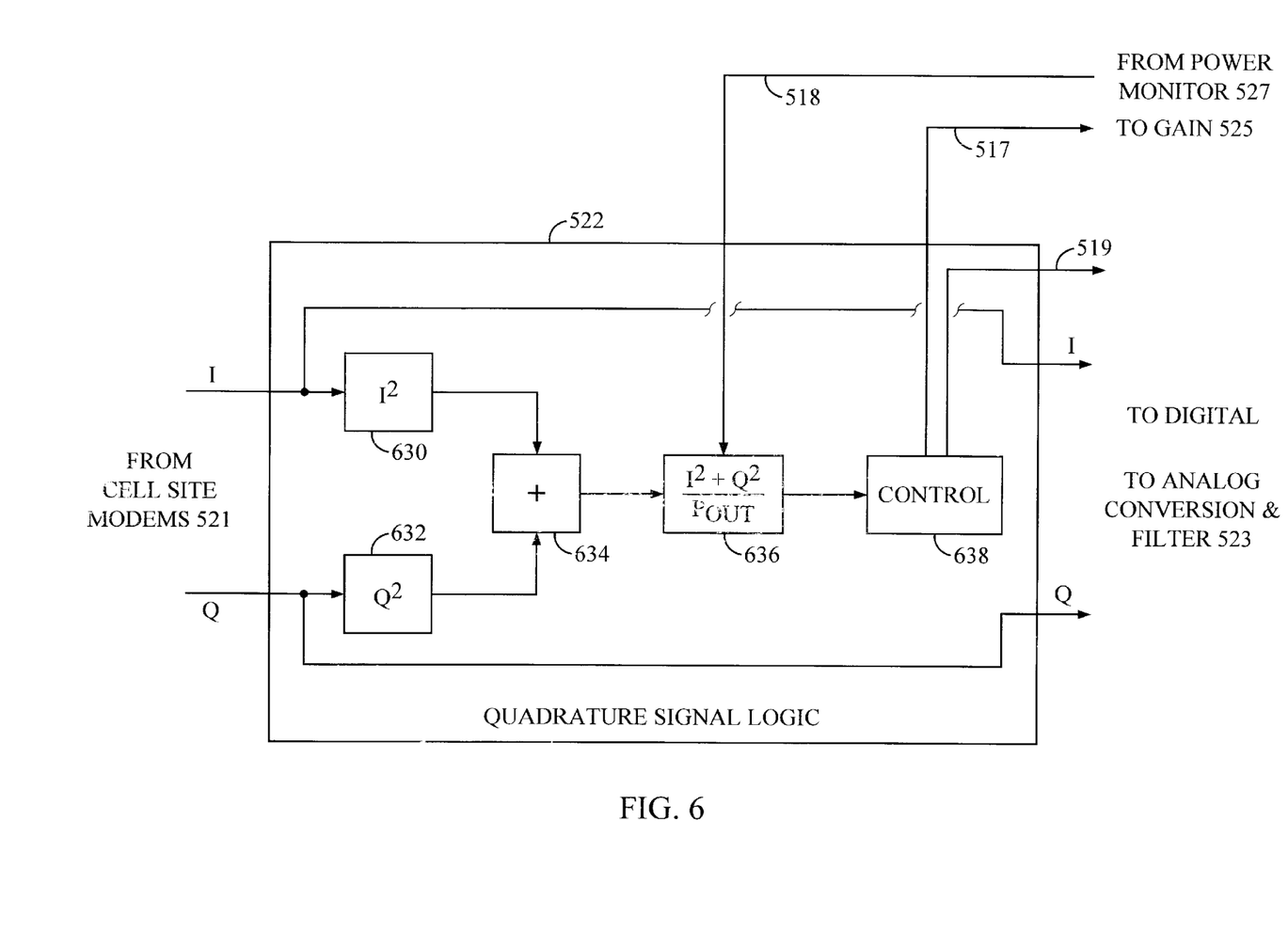
FIG. 6 is a block diagram of quadrature signal logic.

FIG. 6 depicts the quadrature signal logic 522 from FIG. 5. The quadrature signal logic 522 includes: $I^2$ block 630, $Q^2$ block 632, summing block 634, ratio block 636, and control block 638. The quadrature signal logic 522 receives the quadrature signal I from the cell site modems 521 and provides it to the $I^2$ block 630 and to the digital-to-analog conversion and filter 523. The quadrature signal logic 522 receives the quadrature signal Q from the cell site modems 521 and provides it to the $Q^2$ block 632 and to the digital-to-analog conversion and filter 523.

The $I^2$ block 630 squares the quadrature signal I and provides the squared value to the summing block 634. The $Q^2$ block 632 squares the quadrature signal Q and provides the squared value to the summing block 634. The summing block 634 adds the two squared values together to generate a quadrature CDMA signal power $(I^2+Q^2)$ value. The summing block 634 provides the $I^2+Q^2$ value to the ratio block 636.

The ratio block 636 receives the Pout signal 518 indicating the transmit power of the CDMA signal 407. The ratio block 636 determines a ratio that equals $I^2+Q^2$/Pout. The ratio block 636 provides the ratio to the control block 638.

The control block 638 compares the ratio to a pre-determined value. Those skilled in the art are familiar with how to determine this pre-determined value by considering such factors as cell size, maximum rated power, minimum pilot signal strength at receiver, saturation, quantization errors, Ec/Io required at mobile device, and dynamic range of signal path. The control block then generates the power control signal 517 to cause the gain control 525 to adjust the gain of the CDMA signal. The control block 638 configures the power control signal 517 so the ratio moves closer to the pre-determined value. The control block also generates the capacity control signal 519 to indicate an estimate of the excess forward link capacity of the base station 412. The estimate is typically given in a number of additional simultaneous calls that can be handled by the base station 412. The control block 638 transfers the capacity control signal 519 to a base station control system (not shown).

Figure 7:
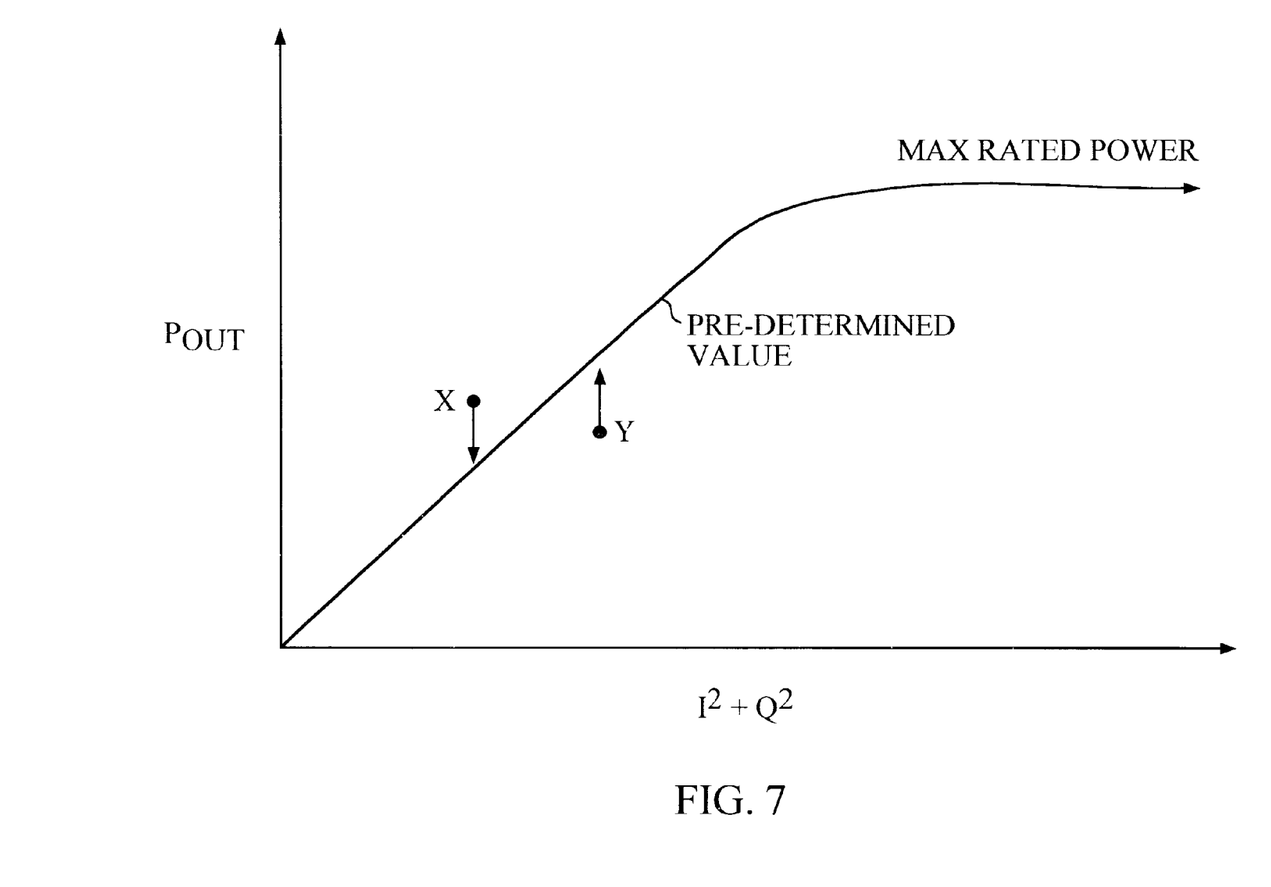
FIG. 7 is a graph illustrating quadrature signal power calculation and control.

FIG. 7 shows the desired relationship between Pout and the $I^2+Q^2$ value. The points X and Y represent operational measurements, and the arrows represent the control applied through the control signal 517 to the gain control 525 to move the ratio closer to the pre-determined value. Those skilled in the art are aware that the slope of the pre-determined value blossoms during start-up and will during shut-down. Based on this document, those skilled in the art will appreciate how to assemble the quadrature signal logic 522 using conventional circuitry and software.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for transmitting a Code Division Multiple Access (CDMA) signal, the method comprising receiving the CDMA signal;

in response to receiving the CDMA signal, processing quadrature components of the CDMA signal to generate a power control signal;

adjusting gain of the CDMA signal in response to the power control signal; and transmitting the CDMA signal after adjusting the gain; wherein processing the quadrature components of the CDMA signal to generate the power control signal further comprises:

processing the quadrature components of the CDMA signal to determine a quadrature CDMA signal power value;

monitoring transmit power of the CDMA signal;

comparing the quadrature CDMA signal power value to the transmit power; and generating the power control signal based on the comparison.

2. The method of claim 1 wherein processing the quadrature components of the CDMA signal to determine a quadrature CDMA signal power value further comprises:

squaring a quadrature I component of the CDMA signal;

squaring a quadrature Q component of the CDMA signal; and summing the squared quadrature I component of the CDMA signal and the squared quadrature Q component of the CDMA signal.

3. The method of claim 1 wherein comparing the quadrature CDMA signal power value to the transmit power and generating the power control signal based on the comparison further comprises:

determining a ratio of the transmit power to the quadrature CDMA signal power value;

comparing the ratio to a pre-determined value; and generating the power control signal to adjust the gain to change the ratio to be closer to the pre-determined value.

4. The method of claim 1 further comprising generating the CDMA signal.

5. The method of claim 1 wherein the method is performed by a multi-sector CDMA base station.

6. The method of claim 1 wherein adjusting gain of the CDMA signal comprises adjusting gain of the CDMA signal without transferring per call gains to gain control circuitry.

7. The method of claim 1 further comprising, in response to receiving the CDMA signal, processing the quadrature components of the CDMA signal to generate a capacity control signal.

8. The method of claim 7 wherein the capacity control signal indicates excess forward link capacity.

9. The method of claim 8 wherein the excess forward link capacity is a number of simultaneous calls.

10. A Code Division Multiple Access (CDMA) device comprising:

quadrature signal logic that is operational to receive and process quadrature components of the CDMA signal to generate a power control signal;

gain circuitry that is operational to automatically adjust a gain of the CDMA signal in response to the power control signal and;

a power monitor that is operational to monitor transmit power of the CDMA signal, and wherein the quadrature signal logic is further operational to process the quadrature components of the CDMA signal and determine a quadrature CDMA signal power value, to compare the quadrature CDMA signal power value to the transmit power, and to generate the power control signal based on the comparison.

11. The CDMA device of claim 10 wherein the quadrature signal logic is further operational to square a quadrature I component of the CDMA signal, to square a quadrature Q component of the CDMA signal, and to sum the squared quadrature I component of the CDMA signal and the squared quadrature Q component of the CDMA signal.

12. The CDMA device of claim 10 wherein the quadrature signal logic is further operational to determine a ratio of the transmit power to the quadrature CDMA signal power value, to compare the ratio to a pre-determined value, and to generate the power control signal to adjust the gain to change the ratio to be closer to the pre-determined value.

13. The CDMA device of claim 10 wherein the device is a multi-sector CDMA base station.

14. The CDMA device of claim 10 further comprising a cell site modem operational to generate the CDMA signal.

15. The CDMA device of claim 14 further comprising a digital-to-analog converter operational to convert the CDMA signal from digital to analog.

16. The CDMA device of claim 15 further comprising a low-pass filter operational to attenuate portions of the CDMA signal outside of a bandwidth.

17. The CDMA device of claim 16 further comprising an up-converter operational to convert the CDMA signal to a radio frequency CDMA signal.

18. The CDMA device of claim 17 further comprising a power amplifier operational to amplify the CDMA signal.

19. The CDMA device of claim 18 further comprising an antenna operational to transmit the CDMA signal.

20. The CDMA device of claim 10 wherein the quadrature signal logic is further operational to generate the power control signal without using information indicating per call gains.

21. The CDMA device of claim 10 wherein the quadrature signal logic is further operational to process the quadrature components of the CDMA signal to generate a capacity control signal.

22. The CDMA device of claim 21 wherein the capacity control signal indicates excess forward link capacity.

23. The CDMA device of claim 22 wherein the excess forward link capacity is a number of simultaneous calls.

\* \* \* \* \*